United States Patent
Kogure et al.

(10) Patent No.: US 6,541,533 B2
(45) Date of Patent: Apr. 1, 2003

(54) EXTRUDED POLYOLEFIN RESIN FOAM

(75) Inventors: Naochika Kogure, Kanuma (JP); Seiji Takahashi, Kanuma (JP); Masato Naito, Kanuma (JP); Takashi Kitahama, Kanuma (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 10/038,897

(22) Filed: Jan. 8, 2002

(65) Prior Publication Data

US 2002/0137809 A1 Sep. 26, 2002

Related U.S. Application Data

(63) Continuation-in-part of application No. PCT/JP01/07310, filed on Aug. 27, 2001.

(30) Foreign Application Priority Data

Jan. 10, 2001 (JP) .............................. 2001/002907

(51) Int. Cl.$^7$ .................................................. C08J 9/00
(52) U.S. Cl. ...................................... 521/134; 521/139
(58) Field of Search ................................. 521/134, 139

(56) References Cited

U.S. PATENT DOCUMENTS

| | | | |
|---|---|---|---|
| 5,110,842 A | | 5/1992 | Uejikkoku et al. |
| 5,883,141 A | * | 3/1999 | Mihayashi et al. |
| 6,326,409 B1 | * | 12/2001 | Mihayashi et al. |

FOREIGN PATENT DOCUMENTS

| | | |
|---|---|---|
| EP | 0-636473 A1 | 2/1995 |
| JP | 56-028837 | 3/1981 |
| JP | 10-279724 | 10/1998 |
| JP | 2000-007817 | 1/2000 |

* cited by examiner

*Primary Examiner*—Morton Foelak
(74) *Attorney, Agent, or Firm*—Sherman & Shalloway

(57) ABSTRACT

The present invention provides thick extruded foam which is extruded polyolefin resin foam having open cells, used for cushion material and packaging material and the like, which exhibits uniform physical product properties, high expansion ratio, and uniform cell diameter.

The extruded open cell foam of the present invention is an extruded foam exhibiting an open cell foaming ratio of 50% or greater, the base resin whereof is principally composed of a mixed polymer consisting of 4.5 to 75 parts by weight of component A consisting of an ethylene ionomer resin, 0.5 to 30 parts by weight of component B consisting of a polyolefin resin having a melting point exceeding 120° C., and 20 to 95 parts by weight of component C consisting of one or two or more polymers selected from a group of ethylene-propylene rubbers, styrene elastomers, and polyethylene resins having melting points of 120° C. or lower (where component A+component B+component C=100 parts by weight). Various kinds of additives such as anti-shrinking agents can be mixed in this extruded foam.

14 Claims, No Drawings

EXTRUDED POLYOLEFIN RESIN FOAM

This application is a continuation-in-part of International Application No. PCT/JP01/07310 filed Aug. 27, 2001.

TECHNICAL FIELD

This invention relates to extruded polyolefin resin foam used in cushion material, packaging material, sound absorbing material, water absorbing material, anti-vibration material, and various kinds of industrial filters, etc.

BACKGROUND ART

The open cell foams made of synthetic resins known to the prior art include urethane foams, foam rubber, and ethylene-vinyl acetate copolymer foams, etc. These foams, because they are flexible and exhibit good processability, have been used in such applications as cleaning sponges, shock absorbing materials, cushion materials, sound absorbing materials, and various industrial filters. Nevertheless, applications for these open cell extruded foams have been limited due to their inferiority in terms of chemical resistance (acid resistance, alkali resistance, etc.) and weatherability. Furthermore, urethane foams and foam rubber are very difficult to recycle back to raw materials, while ethylene-vinyl acetate copolymer foams are problematic because of their large amount of foul odor during manufacture.

Polyolefin resins, on the other hand, exhibit very outstanding chemical resistance and weatherability, as well as outstanding recyclability. Accordingly, the problems noted above can be overcome if the open cell extruded foam is made of a polyolefin resin.

That being so, attempts have been made before to develop open cell polyolefin resin foams. Art is known, for example, for subjecting a closed cell polyolefin resin foam to pinhole processing to form open cell foam. However, open cell polyolefin resin foams obtained by simply subjecting closed cell foams made from polyethylene resin or polypropylene resin base material to pinhole processing exhibit high permanent compression set, and do not have sufficient shock-absorbing properties to stand up under prolonged use.

Other methods have also been reported, such as that described in Japanese Patent Publication No. S60-55290/1985 which uses a mixture of low-density polyethylene and high-density polyethylene, and that described in Japanese Patent Application Laid-Open No 2000-7817 which uses a mixture of low-fluidity and high-fluidity low-density polyethylenes as the base resin for obtaining an open cell extruded foam. With those methods, however, foam of sufficient thickness, width, and expansion ratio are not obtained, nor do such foams exhibit adequate practical usability. Also known are open cell foams made of polyolefin resins and ionomer resins. In Japanese Patent Application Laid-Open No. H10-279724/1998, for example, a foam is disclosed wherein for 0 to 50 parts by weight of a polyolefin resin are used 100 to 50 parts by weight of a costly ionomer resin. However, when foam extrusion of an open cell foam of such mixture as noted above is performed, the extrusion pressure is high, wherefore heat generation at the die is severe, making it very difficult to obtain good open cell extruded foams exhibiting a high expansion ratio and high thickness. In addition, the molten resin setting temperature (hereinafter called the foaming temperature) must be regulated within a narrow range during extrusion foaming in order to obtain the open cell extruded foam, making stable manufacture difficult. Also, in Japanese Patent Application Laid-Open No. 59-196384/1994, a foam wherein for 100 parts by weight of a polyolefin resin, 60 to 150 parts by weight of an ionomer resin are used, but this is small rod-shaped foam having a cross-sectional area of 0.1 $cm^2$ or so which is used as core material in sealers used in window frames and the like, for example.

In Japanese Patent Application No. 2000-23179, an open cell extruded foam is described wherein a mixture of two or three or more polyolefin resins having different melting points is used as the base resin. More specifically, in this patent application, an open cell extruded foam is described, the main component whereof is a mixed polymer configured by a component consisting of a polyolefin resin, and a component consisting either of one or two or more polymers selected from a group made up of ethylene-α, or β unsaturated carboxylic acid copolymers (but excluding ionomers), olefin elastomers, styrene elastomers, and ethylene-vinyl acetate copolymers, or of such mixed polymer to which a heat reversible crosslinked polymer has been added.

With the resin mixture described above, the range of suitable foaming temperatures wherewith the open cell foam can be stably obtained is narrow, and, if the foaming temperature is higher than the suitable foaming temperatures, the foam contracts, making it difficult to obtain foam having the desired expansion ratio and thickness, whereas, if the foaming temperature is lower than the suitable foaming temperatures, the closed cell foaming ratio rises and the desired open cell foam is not obtained. If an attempt is made to obtain an open cell foam of high foaming expansion ratio, moreover, the cell wall thickness of the foam becomes thin, it becomes very difficult to retain the shape of the open cell foamed cell walls during extrusion foaming, and good foam is difficult to obtain.

Thus, in the prior art, it has been very difficult to stably manufacture foam exhibiting uniform physical product properties, and to stably manufacture polyolefin resin open cell extruded foam exhibiting high expansion ratio and high open cell foaming ratio, especially thick product exhibiting uniform physical properties.

With the foregoing in view, it is an object of the present invention to provide extruded open cell foam of uniform physical product properties, with a high expansion ratio, and uniform cell diameter, particularly such extruded open cell foam that is thick.

DISCLOSURE OF THE INVENTION

The present invention is an extruded polyolefin resin open cell foam having an open cell foaming ratio of 50% or higher. The base resin of the foam of the present invention has as its main component a mixed polymer consisting of 4.5 to 75 parts by weight of a component A consisting of an ethylene ionomer resin, 0.5 to 30 parts by weight of a component B consisting of a polyolefin resin having a melting point exceeding 120° C., and 20 to 95 parts by weight of a component C consisting of one or two or more polymers selected from a group of ethylene-propylene rubbers, styrene elastomers, and polyethylene resins having melting points of 120° C. or lower (where component A+component B+component C=100 parts by weight).

The component B consisting of the polyolefin resin having a melting point exceeding 120° C. should be one or two or more mixed resins selected from among polypropylene resin, linear low-density polyethylenes, and polyethylene resins having a density of 940 kg/$m^3$ or greater.

The polyethylene resin having a melting point of 120° C. or lower in component C should be one or two or more mixed resins selected from among low-density polyethylenes, ethylene-α, or β unsaturated carboxylic acid copolymers (but excluding ionomers), and ethylene-vinyl acetate copolymers.

An anti-shrinking agent can be added to the base resin, whereupon the amount added should be 0.1 to 15 parts by weight for 100 parts by weight of the basic resin.

The extruded open cell foam of the present invention should have a density of 15 to 200 kg/m³ and thickness of 0.5 to 200 mm, which can be configured either as sheet-form foam or plank-form foam. The shape is not limited to a flat shape, however, and rod-shaped foam can also be configured. The form of the rod shapes may be either one with a hollow cross-section or solid cross-section, with a density of 15 to 100 kg/m³ and an area of cross-section (perpendicular to direction of extrusion) of 0.7 cm² or greater being preferred.

The polyolefin resin foam of the present invention is preferably such that the stress relaxation ratio is at least 30% after sustaining 50% compression for one minute, the 25% compression strength in the thickness direction is 1 to 50 kPa, and the 50% compression set is 7% or less. It is also preferable for the cell shape to satisfy the following formulas (a) to (c), and for pores to be formed in the cell wall.

$$0.3 \leq X/Z \leq 1.5 \quad (a)$$

$$0.3 \leq X/Y \leq 1.5 \quad (b)$$

$$0.3 \leq (X+Y+Z)/3 \leq 10 \quad (c)$$

(Where X, Y, and Z are the average cell diameter in the thickness, extrusion, and width directions of the foam, respectively, and the units are in millimeters.)

Based on the present invention, in an extruded open cell foam of broad width, or an extruded open cell foam of large thickness, having a high expansion ratio, good foam is realized with uniform cell diameter and little partial variation in mechanical properties. In the present invention, furthermore, by adding the base resin configured as described in the foregoing, particularly by adding a specific amount of the polyolefin resin having a melting point exceeding 120° C. of component B, to the components A and C, benefits are realized in that the range of suitable foaming temperature for stably obtaining the extruded open cell foam broadens, manufacture of the extruded open cell foam is made easy, and product yield can be improved.

BEST MODE FOR CARRYING OUT THE INVENTION

The extruded polyolefin resin foam of the present invention is an extruded polyolefin resin open cell foam having an open cell foaming ratio of 50% or higher. The base resin for this extruded open cell foam has as its main component a mixed polymer consisting of 4.5 to 75 parts by weight of a component A consisting of an ethylene ionomer resin, 0.5 to 30 parts by weight of a component B consisting of a polyolefin resin having a melting point exceeding 120° C., and 20 to 95 parts by weight of a component C consisting of one or two or more polymers selected from a group of ethylene-propylene rubbers, styrene elastomers, and polyethylene resins having melting points of 120° C. or lower (where component A+component B+component C=100 parts by weight).

The mixed polymer that is the main component in the base resin configuring the extruded open cell foam of the present invention comprises 4.5 to 75 parts by weight of component A, 0.5 to 30 parts by weight of component B, and 20 to 95 parts by weight of component C (where component A+component B+component C=100 parts by weight), and the extruded open cell foam can be manufactured stably. In the interest of obtaining foam exhibiting higher expansion ratio, broad width, and high thickness, and also in the interest of restraining heat generation caused by the high viscosity of resin during extrusion foaming, moreover, it is preferable that component A be 5 parts by weight or greater but less than 50 parts by weight, that component B be 1 to 30 parts by weight, and that component C be 20 to 90 parts by weight (where component A+component B+component C=100 parts by weight), and, in the interest of obtaining even more outstanding foam cell uniformity and less permanent compressive strain, it is particularly preferable that the component A be 10 to 45 parts by weight, component B 1 to 15 parts by weight, and component C 40 to 70 parts by weight (where component A+component B+component C=100 parts by weight).

In this invention, when the component A noted in the foregoing is less than 4.5 parts by weight, a closed cell foam is formed at a resin extrusion temperature wherewith a foam is obtained, and the targeted foam cannot be obtained even by making the extrusion temperature higher in an effort to obtain open cell foam. When the component A exceeds 75 parts by weight, on the other hand, heat generation in the die becomes severe, and it is very difficult to obtain extruded open cell foam of high thickness and high expansion ratio.

When component B is less than 0.5 parts by weight, moreover, the shape retention effect in the cells configuring the foam becomes small and it becomes very difficult to obtain extruded open cell foam exhibiting a high expansion ratio and high wall thickness having uniform physical properties, and, particularly in a thick foam, cell uniformity is lost and giant cells are generated. When component B exceeds 30 parts by weight, on the other hand, foamability is impaired, and good extruded open cell foam cannot be obtained.

When component C is less than 20 parts by weight, there will be little quantity of component of low melt tension in the vicinity of the foaming temperature, making it very difficult to obtain extruded open cell foam. When component C exceeds 95 parts by weight, on the other hand, closed cell foam forms readily, and it becomes very difficult to obtain extruded open cell foam.

The extruded polyolefin resin foam of the present invention has an open cell foaming ratio of 50% or higher. When the open cell foaming ratio is less than 50%, certain effects manifest by the peculiar functions exhibited by the extruded open cell foam, such as restorability after repeated stress, cushioning properties, flexibility, sound absorption, water absorption, and gas permeability, are lessened, and it becomes difficult to deal with an open cell foam in terms of function and physical properties. By the open cell foaming ratio of the extruded open cell foam in the present invention, moreover, is meant not just a value for a portion of the foam, but an average value for the foam overall. Accordingly, even if in one part of the extruded open cell foam there is a portion that falls below the open cell foaming ratio specified in the present invention, that is permissible so long as the average value for the foam overall is equal to or higher than the open cell foaming ratio specified in the present invention.

In the interest of making the restorability after repeated stress, cushioning properties, flexibility, sound absorption, water absorption, and gas permeability that are properties peculiar to extruded open cell foams particularly outstanding, the open cell foaming ratio should be 70% or higher and preferably 80% or higher. When the open cell foaming ratio is 70% or higher, the foam becomes extremely soft to the touch, and clearly differs from foam having an open cell foaming ratio below 70%.

The open cell foaming ratio in the present invention is measured as noted below, in accordance with ASTM D-2856-70 (procedure C).

The true volume $V_x$ (cm$^3$) of the measurement specimen is found using an air pycnometer, the apparent volume $V_a$ (cm$^3$) of the measurement specimen is found from the outer dimensions thereof, and the open cell foaming ratio (%) is calculated by formula 1 below By true volume $V_x$ is meant the sum of the volume of the resin and the volume of the closed cell portion in the measurement specimen.
Formula 1

$$\text{Open cell foaming ratio (\%)}=\{(V_a-V_x)/(V_a-W/\rho)\}\times 100$$

where W is the weight (g) of the measurement specimen, and $\rho$ is the density (g/cm$^3$) of the base resin configuring the foam.

The dimensions of the measurement specimen is 25 mm longitudinally, 25 mm laterally, and 40 mm in thickness. The extruded foam of the present invention, as described subsequently, can be configured in a sheet-form, plank-form, or rod-shaped form, in every which case samples are formed by cutting to the prescribed dimensions. In such cases, if a specimen having dimensions matching the dimensions of the measurement specimen described above cannot be obtained from one cutout sample, then multiple cutout samples are combined to prepare one measurement specimen. If, for example, one cutout sample were 25 mm longitudinally, 25 mm laterally, and 20 mm in thickness, then two cutout samples having these dimensions would be stacked together to prepare a measurement specimen measuring 25 mm longitudinally, 25 mm laterally, and 40 mm in thickness.

Multiple sampling sites for the measurement specimens are established (preferably 10 or more sites), the open cell foaming ratio for each of those multiple measurement specimens obtained is found and the average value thereof calculated, and that average value is made the open cell foaming ratio of the extruded foam of the present invention.

The main component in the base resin of the extruded open cell foam of the present invention is a mixed polymer configured of a component A consisting of an ethylene ionomer resin, a component B consisting of a polyolefin resin having a melting point exceeding 120° C., and a component C consisting of one or two or more polymers selected from a group of ethylene-propylene rubbers, styrene elastomers, and polyethylene resins having melting points of 120° C. or lower. In the present invention, furthermore, by saying that the mixed polymer is the main component in the base resin is meant that the mixed polymer is contained in an amount that at least exceeds 50 wt. % of the base resin configuring the extruded open cell foam, but preferably 75 wt. % or more, and even more preferably 90 wt. % or more.

Accordingly, besides the mixed polymer consisting of the components A, B, and C noted above, a conventionally known resin or rubber or the like can be mixed, within a range of up to but not including 50 wt. %, in the base resin of the extruded open cell foam of the present invention, among which those with which a polymer composition of a denatured polyolefin polymer such as an ethylene-maleic acid anhydride-ethyl acrylate terpolymer or ethylene-butene-1 copolymer and a hydroxyl group containing polymer such as hydroxyl group ended polybutadiene hydrogenation product, methacrylic acid 2-hydroxyethyl graft ethylene-butene-1 copolymer, or low molecular weight polyolefin polyol are mixed, wherewith the crosslinked structure is weakened by heating, having so-called heat reversible crosslinked structures, being particularly preferred because therewith compressive elasticity is enhanced, and outstanding extruded open cell foam exhibiting little permanent compressive strain is formed.

By the ethylene ionomer resin configuring component A of the base resin in the present invention is meant a metal salt crosslinked compound of a copolymer between an ethylene monomer and an α or β unsaturated carboxylic acid such as acrylic acid, methacrylic acid, itaconic acid, maleic acid, fumaric acid, or cinnamic acid, etc. Examples of such metal salts that may be cited include alkali metal salts, alkali earth metal salts, typical metal salts, and transition metal salts. Metal salt crosslinked compounds of these polymers form a type of crosslinked structure between molecules by the ionic bonding force of the metal ions, whereby physical properties like those of crosslinked molecules are exhibited at room temperature, but processability like that of a non-crosslinked polymer is exhibited at the high temperatures where extrusion molding is possible.

Specific examples of such ethylene ionomer resins that may be cited include ionomer resins wherein crosslinking is effected by metal ions between the molecules of such copolymers as ethylene-acrylic acid copolymer, ethylene-acrylic acid-methylacrylate copolymer, ethylene-acrylic acid-ethylacrylate copolymer, ethylene-methacrylic acid-methylacrylate copolymer, ethylene-methacrylic acid-ethylacrylate copolymer, or ethylene-methacrylic acid copolymer, etc. Nor is the ethylene ionomer resin limited to a single resin, but may be one wherein two or more ethylene ionomer resins have been mixed.

The component B comprising the polyolefin resin having a melting point exceeding 120° C. that configures the base resin in the present invention may be a polyethylene resin, polypropylene resin, or polybutene resin or the like. For the polyethylene resin noted here, polyethylenes having a density of 940 kg/m$^3$ or greater, and linear low-density polyethylenes and the like may be cited. For the polyolefin resin in component B, of the resins noted above, either one type or a mixture of two or more types of polypropylene resin linear low-density polyethylene or polyethylene having a density of 940 kg/m$^3$ or greater is preferable. By the component B, the range of suitable foaming temperatures during extraction foaming is broadened and it becomes possible to stably manufacture good extruded open cell foam.

The polyethylene resin having a melting point exceeding 120° C. that configures the component B noted earlier is an ethylene homo-polymer or a copolymer between ethylene, on the one hand, and an α-olefin having 3 to 12 carbons or the like, on the other, wherein the ethylene component is contained in an amount of 50 wt. % or more. Specific examples thereof that may be cited include high-density polyethylenes, medium-density polyethylenes, linear low-density polyethylenes, ethylene-anhydrous maleic acid copolymers, ethylene-butene copolymers, ethylene-vinyl alcohols, and ethylene-glycidyl methacrylates, etc, respectively having a melting point exceeding 120° C. Furthermore, the polyethylene resin is not limited to a single resin but may be one wherein two or more types of polyethylene resin have been mixed.

By a polypropylene resin having a melting point exceeding 120° C. configuring the component B is meant a propylene homo-polymer or a copolymer between propylene, on the one hand, and another monomer component on the other, wherein the propylene component is contained in an amount that is 50 wt. % or greater. That copolymer may be a random copolymer, a block copolymer, or a graft copolymer Examples of the other monomer component configuring the copolymer that may be cited include ethylene, 1-butene, isobutylene, 1-pentene, 3-methyl-1-butene, 1-hexene, 3,4-dimethyl-1-butene, 1-pentene, and 3-methyl-1-hexene, etc. Furthermore, the polypropylene resin is not limited to a single resin but may be one wherein two or more polypropylene resins have been mixed.

For the component B in the present invention, moreover, not only may a polyethylene resin, polypropylene resin, or polybutene resin or the like be used singly, but a mixture of two or more types thereof may be used.

The component C configuring the base resin in the present invention is one or two or more types of polymer selected from among the group of ethylene-propylene rubbers, styrene elastomers, and polyethylene resins having a melting point of 120° C. or lower.

The polyethylene resin having a melting point of 120° or lower configuring the component C is an ethylene homopolymer or a copolymer between ethylene, on the one hand, and an α-olefin having 3 to 12 carbons or the like, on the other, wherein the ethylene component is contained in an amount of 50 wt. % or greater. Specific examples thereof that may be cited include low-density polyethylenes, medium-density polyethylenes, linear low-density polyethylenes, very low-density polyethylenes, ethylene-anhydrous maleic acid copolymers, ethylene-butene copolymers, ethylene-vinyl alcohols, ethylene-glycidyl methacrylates, ethylene-α or β unsaturated carboxylic acid copolymers (but excluding ionomers), and ethylene-vinyl acetate copolymers, having a melting point of 120° C. or lower. Furthermore, this polyethylene resin is not limited to a single resin, but use may be made of one wherein two or more types have been mixed. Among these polyethylene resins, one type or a mixed resin of two or more types selected from among the low-density polyethylenes, ethylene-α or β unsaturated carboxylic acid copolymers (but excluding ionomers), and ethylene-vinyl acetate copolymers is particularly to be preferred.

For the α, or β unsaturated carboxylic acid component of the ethylene-α, or β unsaturated carboxylic acid copolymer in the polyethylene resins having a melting point of 120° C. or lower, acrylic acid, methacrylic acid, itaconic acid, maleic acid, fumaric acid, and cinnamic acid, together with alkyl esters and the like thereof may be cited, of which, from the perspective of general-purposefulness, acrylic acid, methacrylic acid, and alkyl esters thereof are to be preferred.

The ethylene-α or β unsaturated carboxylic acids noted above are obtained by copolymerizing ethylene with the α or β unsaturated carboxylic acid component. More specifically, ethylene-acrylic acid copolymers, ethylene-methyl acrylate copolymers, ethylene-ethyl acrylate copolymers, ethylene-methacrylic acid copolymers, ethylene-methyl methacrylate copolymers, and ethylene-ethyl methacrylate copolymers and the like may be cited-The content ratio for the α or β unsaturated carboxylic acid in the ethylene-α or β unsaturated carboxylic acid copolymer noted above should be 2 to 50 wt. %, with 10 to 40 wt. % being particularly to be preferred.

For the ethylene-vinyl acetate copolymer in the polyethylene resin having a melting point of 120° C. or lower, the vinyl acetate content prefers to be 5 to 50 wt. %. Because the difference in viscosity with the component A is appropriate, extruded open cell foam can be obtained with even greater stability in the extraction process.

In the present invention, the melting point of the polyolefin resin configuring the component B and of the polyethylene resin configuring the component C is made the temperature at the apex of a peak found from test pieces subjected to a certain heat treatment according to the heat flux DSC curve based on JIS K7121 (1987). When two or more peaks appear, the temperature at the apex of the main peak having the largest peak area is made the melting point. The density of the polyethylene resin of the component B is found according to JIS K7112 (1980).

Citable examples for the ethylene propylene rubber configuring the component C include ethylene-propylene copolymers and ethylene-propylene-diene copolymers.

Citable examples for the styrene elastomer configuring the component C include styrene-butadiene-styrene block copolymers (SBS), styrene-isoprene-styrene block copolymers (SIS), styrene-ethylene copolymers, styrene-ethylene-propylene copolymers, SBS hydrogenation product, and SIS hydrogenation product, etc.

In the present invention, furthermore, various kinds of additives such as anti-shrinking agents, foam regulators, weather-resisting agents, UV radiation absorbers, UV radiation reflectors, infrared radiation absorbers, infrared radiation reflectors, flame retardants, lubricants, colorants, thermal stabilizers, anti-oxidants, crystallization nucleating agents, inorganic fillers, and rubbers, etc., can be suitably mixed into the base resin as necessary.

In the present invention, among the additives noted above, in particular, it is preferable that 0.1 to 15 parts by weight of an anti-shrinking agent be added to 100 parts by weight of the base resin because thereby it is possible to obtain good foam, especially foam exhibiting a high expansion ratio and high thickness.

Citable examples of this anti-shrinking agent include esters of a fatty acid having 10 or more but preferably from 15 to 25 carbons and a polyvalent alcohol having 3 to 7 hydroxyl groups, fatty acid amines having 10 or more but preferably from 15 to 25 carbons, and fatty acid amides having 10 or more but preferably from 15 to 25 carbons, etc.

For the fatty acid having 10 or more carbons in the anti-shrinking agent noted above, stearic acid, oleic acid, lauric acid, behenic acid, lignoceric acid, cerotic acid, heptaconic acid, montanic acid, melissic acid, and laccelic acid, etc., may be cited, while for the polyvalent alcohol having 3 to 7 hydroxyl groups, glycerin, diglycerin, triglycerin, erythritol, arabitol, xylitol, mannitol, sorbitol, and sorbitan may be cited. For the anti-shrinking agent, moreover, a mixture of two or more anti-shrinking agents may also be used.

Specific examples of anti-shrinking agents that may be cited include glyceryl monostearate, glyceryl monobehenate, glyceryl distearate, glyceryl tristearate, polyoxyethylene myristyl amine, polyoxyethylene palmitin amine, polyoxyethylene stearyl amine, lauric acid amide, myristic acid amide, palmitic acid amide, and stearic acid amide, etc.

Examples of the foam regulator noted above that may be cited include fine powdered forms of such inorganic substances as talc, silica, and clay, etc., and such carbonate or bicarbonate salts as alkali metal salts of polyvalent carboxylic acid such as sodium hydrogen tartrate, potassium hydrogen succinate, sodium citrate, potassium citrate, sodium bicarbonate, sodium carbonate, and sodium oxalate, etc., which prefer to be added in an amount of 0.01 to 10 parts by weight to 100 parts by weight of the base resin.

For the foaming agent used in the manufacture of the extruded open cell foam of the present invention, either a physical foaming agent or a decomposing type foaming agent can be used, but the use of a physical foaming agent is preferred in order to obtain extruded open cell foam of high expansion ratio. For a physical foaming agent, fatty hydrocarbons such as propane, normal butane, isobutane, normal pentane, isopentane, normal hexane, isohexane, and cyclohexane, etc. such chloro-hydrocarbons as methyl chloride and ethyl chloride, such fluoro-hydrocarbons as 1,1,1, 2-tetrafluoroethane and 1,1-difluoroethane, etc and such inorganic substances as carbon dioxide, nitrogen, and water, etc may be cited. For a decomposing type foaming agent, azodicarbonamide and the like may be cited. The foaming agents noted above can be used in mixtures of two or more, and a decomposing type foaming agent may be used together with a physical foaming agent and thus serve also to regulate the cell diameter.

The extruded open cell foam of the present invention prefers to have a density of 15 to 200 $kg/m^3$ and a thickness of 0.5 to 200 mm, configured either as sheet-form foam or plank-form foam. Nor is this foam limited to a flat form, but may be configured as rod-shaped foam. The form of the rod-shaped foam may be cross-sectionally hollow or cross-sectionally solid. When the extruded open cell foam of the present invention is sheet-form foam, the sheet-form foam prefers to have a density of 15 to 200 $kg/m^3$ and better still 15 to 60 $kg/m^3$, and a thickness of 0.5 mm or greater but less than 10 mm. The width of the sheet-form foam prefers to be 45 cm or greater, and more preferably with 90 cm or greater, and with an upper limit for the width of 190 cm or so. Sheet-form foam so configured exhibits outstanding flexibility and makes ideal packaging material. It is also possible to subject this foam to such processing as bag fabrication or thermoforming or the like, for use as bags, fruit trays, or other containers. This foam can be used in a wide variety of applications including partitioning materials obtained by performing stamping processing or cutting processing on laminated sheet wherein materials exhibiting shape retention such as other polypropylene resin foam sheet or polystyrene resin foam sheet are integrally laminated, and packaging containers such as fruit packaging materials or precision instrument packaging containers exhibiting high shock-absorption obtained by thermoforming such laminated sheet.

When the extruded open cell foam of the present invention is plank-form foam, the density prefers to be 15 to 100 $kg/m^3$ and the thickness 10 to 200 mm. The width of the plank-form foam should be at least 8 cm, with 25 cm or greater being preferable, and with an upper limit on the width of 150 cm or so. Plank-form foam so configured is ideal for shock absorbing pads, sound absorbing materials, and cushion materials and the like. In particular, when compared to the soft urethane open cell foam used conventionally as a cushion material, the plank-form foam of the present invention exhibits mild compressive strain (the deforming speed being slower than that of ordinary soft urethane), which property is an outstanding property deserving particular mention for applications such as cushion material. This plank-form foam can be made into any desired shape, to suit the application, by stamping processing or cutting processing.

When the extruded open cell foam of the present invention is rod-shaped foam, the density prefers to be 15 to 100 $kg/m^3$, and the area of the cross-section perpendicular to the direction of extrusion prefers to be 0.7 $cm^2$ or greater and more preferably from 1 to 900 $cm^2$. When the rod-shaped foam has a hollow cross-section, it is configured in a cylindrical shape, whereas when the rod-shaped foam has a solid cross-section, it is configured in a columnar shape. By forming cut creases in the longitudinal direction of the cylindrically shaped foam, use as shock-protecting material for pipes and columns and the like is possible, while the foam of the columnar shape can be used as packing and sealing material, taking advantage of the delayed restoration property (the fact that the speed of shape restoration after compression deformation is slower than that of ordinary soft urethane) peculiar to such foam. It is also easy to obtain cushion material and the like of large volume by joining the side surfaces of many rod-shaped foam bodies together.

In the present invention, the thickness and density of the extruded open cell foam are measured as described below. That is, for the thickness of the extruded open cell foam, the thickness of the foam is measured at ten points at equal intervals from one edge to the other edge in the width dimension, and the arithmetic mean of those ten points is taken. For the density of the extruded open cell foam, the weight (g) of a test piece that is 5 cm longitudinally, 5 cm across, and the thickness of the foam is measured, the volume ($cm^3$) of the test piece is next found from the outer dimensions of the test piece, and the quotient obtained by dividing the weight (g) of the test piece by the volume thereof is converted to $kg/m^3$ units.

The open-cell foam of the present invention is preferably such that the stress relaxation ratio is at least 30% after sustaining 50% compression for one minute in a compression test, the 25% compression strength in the thickness direction is 1 to 50 kPa, and the 50% compression set is 7% or less. It is even better for the stress relaxation ratio after sustaining 50% compression for one minute to be at least 35%, with 40% or higher being better yet. If the stress relaxation ratio is less than 30%, there will be so little stress relaxation with respect to a load that the material will tend not to have the property whereby load is applied locally and the load of a weight is received uniformly over a plane, and the foam will enter a greatly distorted state (hereinafter referred to as an "overload state"). Therefore, the cushion performance toward the road of a weight is decreased, and a weight placed on the foam does not sit well, making it difficult to achieve a stable state.

In other words, with a foam with a stress relaxation ratio of at least 30%, the stress against deformation of a foam decreases over time in the following manner when constant deformation is continuously applied (hereinafter referred to as stress relaxation). When an open-cell foam with a stress relaxation ratio of at least 30% is subjected to a compression load P ($kgf/cm^2$) such that the thickness of the foam decreases by 50%, an internal stress P ($kgf/cm^2$) is generated in the foam as a force that attempts to push back the load (the stress relaxation ratio at this point is 0%). However, when the compression is held at 50%, this internal stress diminishes over time, and the compression load for maintaining the thickness of the foam at 50% drops to 0.7 P ($kgf/cm^2$) or less after one minute (the stress relaxation ratio at this point is at least 30%). Thus, the compression stress gradually decreases by at least 30% within one minute of the load being applied. This decrease continues until the internal stress of the foam reaches a constant value.

When an irregularly shaped object of a specific weight is placed on a foam, a portion of the foam receives a concentrated load, but before long the internal stress of the foam relaxes and the surface area in contact with the object increases, which allows any further concentration of load to be avoided. Therefore, the pressure can be dispersed when the object is supported, allowing the concentration of repulsion of the object to be avoided as well, so support stability is better and the surface where the object is placed is protected. In particular, when a foam having this property is used for the padding of a chair or the like, when a person sits on the chair, the foam will fit and conform to the curves of the body, supporting the body with uniform force, so the chair can be used for extended periods without fatigue. This property can also be used to advantage in antidecubitus mattresses.

Furthermore, if a foam has a stress relaxation ratio of at least 30%, deformation by rapid compression or the like will be met with strong repulsion, so the amount of deformation will be small, whereas the deformation will be more gradual with slow compression, etc., and the energy will be absorbed, making such a foam suitable for fenders of ships and other such shock absorbing materials.

The upper limit to stress relaxation ratio in the open-cell extruded foam of the present invention is about 80%, and preferably 70%. The open-cell foam of the present invention will have preferable cushioning properties if its stress relaxation ratio is 30 to 80%, and especially 40 to 80%, after sustaining 50% compression for five minutes in a compression test.

The stress relaxation ratio in the present invention was measured according to the method for measuring compression test hardness set forth in JIS K 6767 (1976). The size of the test piece was 100 mm long, 100 mm wide, and 40 mm thick. The amount of compression was 50% of the thickness of the measurement test piece, and the compression rate was 100 mm/minute. More specifically, the test piece was placed between the parallel plates of the tester, the plates were closed at a rate of 100 mm/min. until the thickness of the test piece reached 50% of the original thickness, the force (kgf/cm$^2$) at which the test piece pushed back on the plates at the point when the plates were stopped was termed Fa, the force (kgf/cm$^2$) at which the test piece pushed back on the plates one minute after the plates had stopped was termed Fb, and the value calculated from the following formula (2) was termed the stress relaxation ratio. Incidentally the stress relaxation ratio after sustaining 50% compression for five minutes was calculated from the following formula (2) using the value of Fb as the value five minutes after plate stoppage.

$$\text{stress relaxation ratio } (\%) = \{1 - [Fb/Fa]\} \times 100 \quad (2)$$

The test piece was adjusted as follows according to the shape of the open-cell foam.

Specifically, when the foam was in the form of a sheet, several samples were cut to a size of 100 mm long and 100 mm wide, and the cut samples were stacked to a thickness of 40 mm to produce the test piece. The number of layered sheet is a minimum number, therefore, thickness of a sample is adjusted to 40 mm by slicing one of the layered sheets if necessary.

When the foam was in the form of a board, a rectangle was cut out to a size of 100 mm long, 100 mm wide, and 40 mm thick and used as the measurement sample. If a rectangle could not be cut to the above thickness, samples of the required size were stacked to a thickness of 40 mm thick as well as the above said foam sheet, and this product was used as the measurement sample. Also, with a foam board, there may be variance in the stress relaxation ratio from place to place in the foam, so measurement samples were cut out uniformly from various sections of the foam so as to ascertain how the stress relaxation ratio varied throughout the entire foam, the stress relaxation ratio of the various measurement samples that were cut out was averaged, and this average was used as the stress relaxation ratio for the foam.

The stress relaxation ratio of a foam is believed to depend chiefly upon the characteristics of the base resin and the cell structure. For instance, with an open-cell structure in which the cells are almost only skeleton, with almost no cell walls present, such as with a soft polyurethane foam, air within the foam easily and quickly escapes when the foam is compressed, so the air flow-through resistance is weak with respect to compression, and the characteristics of the base resin alone have a major effect. Accordingly, there ends up being little difference between the compression strength at the instant of compression and the compression strength after the compression has been held for a specific length of time, and the stress relaxation ratio is low.

Meanwhile, with a foam having a cell structure in which cell walls are present, but some of these cell walls are ruptured and the cells become open, it is difficult for the air inside the foam to escape when the foam is compressed, the resistance of air flow-through against compression increases, and the escape of the air acts to relax the stress. Moreover, it is believed that if a resin is selected that has characteristics that strike a good balance between rigidity and flexibility, etc., there will be a greater difference between the compression strength at the instant of compression and the compression strength after the compression has been held for a specific length of time, and the stress relaxation ratio is higher.

As mentioned above, it is preferable for the compression strength at 25% compression in the thickness direction of the open-cell foam of the present invention to be 1 to 50 kPa, but a better range is 1 to 35 kPa, and 1 to 25 kPa is even better. If the compression strength at 25% compression is less than 1 kPa, the foam will too readily deform under compression, tending to result in an overload state. If the compression strength is over 50 kPa, though, the strength will be too high and result in poor flexibility for some applications. The compression strength at 25% compression is a value obtained by dividing the force equivalent to the load at 25% compression in a stress-strain curve determined by static compression test according to JIS Z 0234/(1976), method A, by the load receiving surface area.

The open-cell foam of the present invention preferably has a 50% compression set of 7% or less, but 5% or less is better, and 4% or less is better still. If the compression set is over 7%, the recovery of the foam will be poor, and compression stress will decrease, particularly in applications in which the foam is used repeatedly.

In the present invention, compression set was measured according to the method for measuring compression set defined in JIS K 6767 (1976). The amount of compression was 50% of the thickness of the test piece, and the size of the test piece was 50 mm long, 50 mm wide, and 40 mm thick. Compression set was calculated from the following formula (3).

$$\text{compression set } (\%) = \{(t_0 - t_1)/t_0\} \times 100 \quad (3)$$

$t_0$: original thickness of test piece (mm)
$t_1$: thickness of test piece after test (mm)

The test piece was adjusted as follows according to the shape of the open-cell foam.

When the foam was in the form of a sheet, several samples were cut to a size of 50 mm long and 50 mm wide, and the cut samples were stacked to a thickness of 40 mm to produce the test piece. The number of layered sheet is a minimum number, therefore, thickness of a sample is adjusted to 40 mm by slicing one of the layered sheets if necessary.

When the foam was in the form of a board, several rectangles were cut out to a size of 50 mm long, 50 mm wide, and 40 mm thick and used as the measurement samples. If a rectangle could not be cut to the above thickness, the cut samples were stacked to adjust to the required thickness as well as the above said foam sheet, and this product was used as the measurement sample.

It is preferable with the foam of the present invention if the following relationships exist between X (the average cell diameter in the thickness direction of the foam), Y (the average cell diameter in the extrusion direction (MD) of the foam), and Z (the average cell diameter in the width direction of the foam), and if pores are formed in the cell walls.

$$0.3 \leq X/Z \leq 1.5 \quad (a)$$

$$0.3 \leq X/Y \leq 1.5 \quad (b)$$

$$0.3 \leq (X+Y+Z)/3 \leq 10 \quad (c)$$

The ratio X/Y of the average cell diameter X in the thickness direction of the foam to the average cell diameter Y in the extrusion direction, and the ratio X/Z of the average cell diameter X in the thickness direction to the average cell diameter Z in the width direction are each preferably 0.3 to 1.3, with a range of 0.5 to 1.0 being particularly favorable. If one or both of X/Y and X/Z is or are less than 0.3, the cells will have a flat shape, and while this shape of cells has no particular problem in terms of the flexibility of the foam, there will be more deformation under compression in the thickness direction, making the foam susceptible to an overload state. On the other hand, if one or both of X/Y and X/Z is or are over 1.5, the compression strength will be too high and flexibility may be poor. Therefore, a foam having cells whose shape is such that the values of X/Y and X/Z fall within the above range will undergo roughly the same amount of compression deformation in the MD, TD, and thickness direction, and compression recovery characteristics will be particularly good when the foam will be compressed.

The open-cell foam of the present invention preferably has an average cell diameter of 0.3 to 10.0 mm, as indicated by the above formula (c). If the average cell diameter is less than 0.3 mm, foam recovery will be extremely slow, the cell wall thickness will be too thin, the force maintaining the cell shape will be weak, and the cells will tend to have a flattened shape. If the average cell diameter is over 10.0 mm, on the other hand, the cell wall thickness will be too thick, the foam will be unattractive in appearance, and the compression recovery will be poor.

If the foam is in the form of a board, the average cell diameter is preferably 0.4 to 5.0 mm. With a foam sheet, the average cell diameter is preferable 0.3 to 3.0 mm, with a range of 0.4 to 2.0 mm being even better. If the average cell diameter is over 3.0 mm, the cell wall thickness will be too thick for a foam sheet, the appearance will suffer in some applications, and flexibility will also be poor.

The above-mentioned X (average cell diameter in the thickness direction), Y (average cell diameter in the extrusion direction), and Z (average cell diameter in the width direction) can be determined by using a microscope to observe a cross section perpendicular to the extrusion direction of the foam and a cross section perpendicular to the width direction. More specifically, they are determined as follows. Y (average cell diameter in the extrusion direction) is found by taking an enlarged micrograph or other such image of a cross section perpendicular to the extrusion direction of the foam, and in the enlarged perpendicular cross sections thus obtained drawing parallel lines equivalent to a pre-enlargement length of 5 mm near the foam surface, in the middle, and near the back side. The number n of cells intersecting these lines (n includes cells that partially intersect the lines) is then counted, the average cell diameter per cell on each line is calculated from the formula [5/(n−1)] for a total of three lines drawn near the surface, in the middle in the thickness direction, and near the back, and the arithmetic mean of the average cell diameter per cell is termed Y (mm).

For Z, an enlarged micrograph or other such image is taken of a cross section perpendicular to the width direction of the foam, parallel lines equivalent to a pre-enlargement length of 5 mm are drawn near the foam surface, in the middle, and near the back side in the enlarged perpendicular cross sections thus obtained, and the value determined by the same operation as for determining Y is termed Z (mm).

X is determined from the enlarged cross section perpendicular to the extrusion direction. First, a vertical line is drawn over the entire thickness of the foam in the enlarged cross section perpendicular to the extrusion direction of the measurement sample, the number $n_2$ of cells that intersect the line is counted, and the average cell diameters are determined from the formula (thickness of foam)/$n_2$.

The extruded open cell foam of the present invention can be obtained by taking the base resin noted earlier, such additives as anti-shrinking agents or foaming regulators such as talc which are added as necessary, supplying those to an extruder, subjecting those materials to melting under heating and kneading, then supplying a foaming agent and forming a foaming molten resin mixture, then regulating the extrusion resin temperature, pressure inside the extrusion die, and discharge volume, etc., and extruding the mixture from the die attached to the tip of the extruder into a low-pressure region and causing foaming. For the method of mixing the components A, B, and C and the additives, a known method can be adopted such as the method of dry-blending the mixture components, or the method of using a screw feeder of the like to introduce each of the mixture components from an extruder raw material supply port and mixing them together inside the extruder.

By selecting the die attached to the tip of the extruder according to the shape of the foam intended, moreover, extruded open cell foam of various shapes can be manufactured, whether sheet-form foam, plank-form foam, or rod-shaped foam, etc. If a circular die is attached, for example, sheet-form foam can be obtained, whereas if a flat die is attached, plank-form foam can be obtained, and if a die having a hole matching the cross-sectional shape of the rod bodies is attached, rod-shaped foam can be obtained that is cylindrical or columnar or the like, but if a many-holed die is attached, cord-shaped foam or foam having a wide perpendicular cross-section at right angles to the direction of extrusion wherein multiple rod-shaped foam body side surfaces are fused together can be obtained, and if dies of different shape are attached then foam bodies having different cross-sectional shapes can be manufactured.

Also, if necessary, an apparatus (accumulator) may be installed wherewith the foaming molten resin mixture is accumulated between the extruder and the die or inside the die under conditions of high temperature and high pressure, and, after a prescribed volume has accumulated, that mixture is extruded from the die all at once using a movable ram. By installing an accumulator, the discharge speed can be increased dramatically, wherefore, even if the extruder is small, the foam of the present invention having high expansion ratio and high thickness can be obtained, especially foam that is plank-form or rod-shaped.

In the present invention, extruded open cell foam wherein the open cell foaming ratio is 50% or greater can be formed, as described above, by supplying the base resin and foaming agent and the like to an extruder, heating, melting, and kneading those materials to form a foaming molten resin mixture, and then adjusting the extrusion resin temperature to be within a suitable foaming temperature range. That is, the foaming molten resin mixture wherein the extrusion resin temperature has been adjusted to be within a suitable foaming temperature range exhibits visco-elasticity that resists the foaming power of the foaming agent, so that the mixture foams uniformly, and, at the stage where cell walls are formed, the component C consisting of the polyolefin resin having a melting point of 120° C. or lower and the like cannot follow the stretch of the component A and component B noted earlier, the softening point is low compared to the component A and component B, and a decline in viscoelasticity of component C causes the cell walls to rupture, whereupon open cell foaming occurs evenly. Even if cell wall destruction occurs, caused by the reduced viscoelasticity of component C, the cell shapes themselves are preserved, due to the sufficient visco-elasticity of the component A. It is further thought that, in the present invention, the component B is also contained in the base resin, wherefore the molten viscosity enhancing effect due to the crystallization of the component B after foaming leads to an enhancement in the rigidity of the cells that configure the foam, that in turn results in reinforcing the cell shape retaining function of the component A, as a consequence whereof the suitable foaming temperature range wherein the extruded open cell foam is stably obtained is broadened.

Specifically, the extrusion resin temperature prefers to be adjusted within a range of 100 to 140° C., and more preferably to within a range of 110 to 130° C. When the extrusion resin temperature is below 100° C., the elastic force of the component A and the component C at the time of foaming will be too strong, whereupon it has possibility that extruded open cell foam having a high expansion ratio can not obtain it.

When the extrusion resin temperature exceeds 140° C., on the other hand, it has possibility that such problems arising as that the obtained foam will tend to shrink, or that giant cells will tend to be produced in the foam.

More specifically, when a polyethylene resin with a melting point of 120° C. or less is included as component C, using the melting point of the polyethylene resin as a reference, it is preferable If the extruded resin temperature of the foamable molten resin is set to a range of from (the melting point of the polyethylene resin−5° C.) to (the melting point of the polyethylene resin+20° C.), with a range of from (the melting point of the polyethylene resin−5° C.) to (the melting point of the polyethylene resin+15° C.) being even better.

If the extruded resin temperature is under the above range (the melting point of the polyethylene resin−5° C.), the resulting foam will tend to have closed cells, and it will be difficult to obtain an open-cell foam. On the other hand, if the extrusion temperature is over the above range (the melting point of the polyethylene resin+20° C.), the resulting foam will tend to shrink, and other such problems will be encountered.

The melting point of the above-mentioned polyethylene resin is the peak apex temperature determined from a test piece that has undergone a specific heat treatment using a thermal flux DSC curve on the basis of JIS K 7121 (1987). If there are two or more peaks, then the melting point is deemed to be the apex temperature of the main peak with the largest peak surface area.

The stress relaxation ratio, which is especially important characteristic, in the open-cell foam of the present invention can be adjusted not only by means of the characteristics of the base resin discussed above, but also by means of the diameter and number of pores formed in the cell walls. More specifically, with the open-cell foam of the present invention, it is preferable to adjust so that there are at least 0.6 (average number of pores), and usually 0.8 to 6, pores with an average diameter of 100 to 1500 $\mu$m per cell. Furthermore, since a polyolefin resin containing 4.5 to 75 weight parts, and preferably at least 5 weight parts, but less than 50 weight parts, of the above-mentioned ethylene-based ionomer resin is used as the base resin, the resulting open-cell foam will have suitable rigidity and flexibility, and when a load is applied, the air inside the cells will escape gradually, so a high proportion of stress relaxation will be exhibited, and the compression set will be extremely low.

The average diameter of the pores formed in the cell walls, the average number of pores per cell, and the average thickness of the cell walls can be determined using a microscope to observe a micrograph of cross section perpendicular to the width direction of the foam. The average diameter of the pores was measured by finding the maximum diameter of the individual pores for all the pores seen in said micrograph and using the average of these values as the average diameter of the pores. The average number of pores was found by dividing the total number of pores in said micrograph by the total number of cells. The average cell wall thickness was determined by measuring the maximum thickness of the individual cell walls for all the cell walls in between the various cells in said micrograph, and using the average of these values.

The open cell foaming ratio of the extruded open cell foam can be regulated by such methods as that of selecting the polymer in the component C in the base resin described earlier, that of adding a lubricant to the polymer of the component C, or that of adjusting the viscosity of the component C.

In the present invention, after manufacturing the extruded open cell foam having an open cell foaming ratio of 50% or greater, the open cell foaming ratio of the foam can be raised further by a secondary process such as one employing the method of subjecting the foam to a pin-hole process, piercing it with needles or the like, or one employing the method of destroying cell walls by expansion under heat, or by compression or the like.

The present invention is now described in even greater detail with the citation of embodiments.

The densities, melt flow rates, and melting points of the resins and polymers used are noted in Table 1.

The values given in Table 1 for the melt flow rate (MFR) were measured at a temperature of 190° C., under a load of 21.18 N, according to JIS K7210 (1976).

TABLE 1

| Resin | | Product Name | Manufacturer | Density (kg/m$^3$) | MFR (g/10 min) | Melting point (° C.) |
|---|---|---|---|---|---|---|
| Resin A | Ionomer | Himilan AM7316 | DuPont-Mitsui Polychemicals | 950 | 1.3 | 74.6 |
| Resin B | HDPE | Idemitsu DH 210JZ | Idemitsu Petrochemical | 968 | 5.0 | 133.6 |

TABLE 1-continued

| | Resin | Product Name | Manufacturer | Density (kg/m³) | MFR (g/10 min) | Melting point (° C.) |
|---|---|---|---|---|---|---|
| Resin C | LLDPE | ULTZEX 3550R | Mitsui Petrochemical Industries | 935 | 4.5 | 123.5 |
| Resin D | PP | Idemitsu PP J700GP | Idemitsu Petrochemical | 900 | 8.0 | 162.5 |
| Resin E | PP | SUN-ALLOMER PM620A | SunAllomer | 900 | 8.0 | 149.0 |
| Resin F | LDPE | SUMIKATHENE F101-1 | Sumitomo Chemical | 922 | 0.3 | 110.3 |
| Resin G | LDPE | NUC 8008 | Nippon Unicar | 917 | 4.7 | 107.9 |
| Resin H | EMMA | Acryft WK307 | Sumitomo Chemical | 940 | 7.0 | 76.4 |
| Resin I | EMMA | Acryft WK402 | Sumitomo Chemical | 940 | 20.0 | 73.9 |
| Resin J | VLDPE | EXCELLEN VL EUL731 | Sumitomo Chemical | 895 | 10.0 | 108.6 |
| Resin K | EMMA | NUCREL AN4318 | DuPont-Mitsui Polychemicals | 940 | 31.0 | 78.1 |

Notes:
Ionomer: Ethylene-methacrylic acid-acrylic-acid ester terpolymer metal salts cross-linked compound
HDPE: High-density polyethylene
LLDPE: Linear low-density polyethylene
PP: Polypropylene homopolymer
LDPE: Low-density polyethylene
EMMA: Ethylene-methyl methacrylate copolymer (ethylene content = 75%)
VLDPE: Linear very low-density polyethylene
EMAA: Ethylene-methacrylic acid copolymer (ethylene content = 92%)

Embodiment 1

Raw material obtained by mixing 100 parts by weight of a mixed resin into which were mixed 38 parts by weight of "resin A," 5 parts by weight of "resin B," and 57 parts by weight of "resin G," 2 parts by weight of a foaming regulator master batch in which 5 parts by weight of sodium citrate and 10 parts by weight of talc were mixed for 100 parts by weight of the low-density polyethylene "resin G," and 10 parts by weight of an anti-shrinking agent master batch in which 12 parts by weight of glyceryl monostearate were mixed for 100 parts by weight of the low-density polyethylene "resin G," was supplied to a tandem type extruder having a first extruder with a caliber of 50 mm and a second extruder with a caliber of 65 mm connected by a crossbar passage, heated, and kneaded to make a molten resin, after which isobutane was pressure-injected and kneaded into the resin inside the extruder, as a physical foaming agent, at a ratio of 8 parts by weight to 100 parts by weight of the mixed resin, to make the foaming molten material. Next, the molten material melted and kneaded inside the extruder was extruded from flat dies having a slit width of 30 mm and slit interval of 3 mm to yield plank-form extruded open cell foam.

The density, open cell foaming ratio, average cell diameter, thickness, and width of the foam so obtained were measured, respectively, and the results indicated, respectively, in Table 2.

Cell Uniformity Evaluation

○ . . . No giant cells or crushed cells are observed in the center part of the cross-section of the foam, and cell shape is uniform.

Δ . . . Cell shape in the cross-section of the foam is unevenness.

x . . . Giant cells or crushed cells are observed in the center part of the cross-section of the foam.

Manufacturing Stability Evaluation

○ . . . Density variation across a temperature width of 3° C. or more in the foaming temperature range is less than 5 kg/m³, and the variation in open cell foaming ratio across a temperature width of 3° C. or more in the foaming temperature range is 5% or lower.

x . . . Everything not meeting the criteria noted above.

The average cell diameters given in the table are values arrived at by drawing a straight line crossing the entire thickness of the foam in the thickness dimension, based on photographs obtained from cross-sections perpendicular to the foam extrusion direction or width dimension, counting the number of cells intersecting that straight line, and dividing the foam thickness (mm) by the number of cells so obtained.

TABLE 2

| | | | Physical Properties of Foam | | | | | |
|---|---|---|---|---|---|---|---|---|
| Base Resin Mixed Resin Type | Foaming Conditions Foaming Temperature (° C.) | Density (kg/m³) | Open Cell Foaming Ratio (%) | Average Cell Diameter (mm) | Thickness (mm) | Width (mm) | Cell Uniformity | Manufacturing Stability |
| Ionomer/ | 117 | 38.8 | 100 | 1.28 | 33.4 | 100.0 | ○ | ○ |
| HDPE/ | 118 | 38.5 | 100 | 1.30 | 33.8 | 100.2 | ○ | |

TABLE 2-continued

| Base Resin Mixed Resin Type | Foaming Conditions Foaming Temperature (° C.) | Density (kg/m³) | Open Cell Foaming Ratio (%) | Average Cell Diameter (mm) | Thickness (mm) | Width (mm) | Cell Uniformity | Manufacturing Stability |
|---|---|---|---|---|---|---|---|---|
| LDPE (Resin A/ Resin B/ Resin G) | 119 | 36.2 | 100 | 1.25 | 35.3 | 98.4 | ○ | |
|  | 120 | 37.7 | 100 | 1.18 | 35.3 | 98.3 | ○ | |
|  | 121 | 35.9 | 100 | 1.28 | 35.9 | 98.3 | ○ | |

Embodiment 2

Extruded plank-form extruded open cell foam was obtained with the same conditions as in Embodiment 1 except in that 100 parts by weight of mixed resin were made by mixing 38 parts by weight of "resin A," 5 parts by weight of "resin B," and 57 parts by weight of "resin H." The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 3.

TABLE 3

| Base Resin Mixed Resin Type | Foaming Conditions Foaming Temperature (° C.) | Density (kg/m³) | Open Cell Foaming Ratio (%) | Average Cell Diameter (mm) | Thickness (mm) | Width (mm) | Cell Uniformity | Manufacturing Stability |
|---|---|---|---|---|---|---|---|---|
| Ionomer/ HDPE/ EMMA (Resin A/ Resin B/ Resin H) | 118 | 46.2 | 98 | 0.93 | 30.1 | 97.2 | ○ | ○ |
|  | 119 | 46.7 | 97 | 0.95 | 29.9 | 95.2 | ○ | |
|  | 120 | 48.7 | 98 | 0.90 | 29.4 | 92.4 | ○ | |
|  | 121 | 49.3 | 99 | 0.94 | 29.0 | 92.2 | ○ | |

Embodiment 3

Extruded plank-form extruded open cell foam was obtained with the same conditions as in Embodiment 1 except in that 100 parts by weight of mixed resin were made by mixing 38 parts by weight of "resin A," 5 parts by weight of "resin B," 28.5 parts by weight of "resin F," and 28.5 parts by weight of "resin I." The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 4.

TABLE 4

| Base Resin Mixed Resin Type | Foaming Conditions Foaming Temperature (° C.) | Density (kg/m³) | Open Cell Foaming Ratio (%) | Average Cell Diameter (mm) | Thickness (mm) | Width (mm) | Cell Uniformity | Manufacturing Stability |
|---|---|---|---|---|---|---|---|---|
| Ionomer/ HDPE/ LDPE/ EMMA (Resin A/ Resin B/ Resin F/ Resin I) | 117 | 34.4 | 96 | 1.33 | 39.1 | 104.0 | ○ | ○ |
|  | 118 | 34.3 | 97 | 1.30 | 39.6 | 101.2 | ○ | |
|  | 119 | 36.8 | 100 | 1.23 | 37.8 | 101.4 | ○ | |
|  | 120 | 36.0 | 96 | 1.25 | 37.0 | 99.4 | ○ | |
|  | 121 | 35.6 | 98 | 1.32 | 36.8 | 96.2 | ○ | |

Embodiment 4

Raw material obtained by mixing 100 parts by weight of a mixed resin into which were mixed 29 parts by weight of "resin A," 5 parts by weight of "resin B.," 38 parts by weight of "resin F," and 28 parts by weight of "resin I," 2 parts by weight of a foaming regulator master batch in which 5 parts by weight of sodium citrate and 10 parts by weight of talc were mixed for 100 parts by weight of the low-density polyethylene "resin G." and 10 parts by weight of an anti-shrinking agent master batch in which 12 parts by weight of glyceryl monostearate were mixed for 100 parts by weight of the low-density polyethylene "resin G," was supplied to a tandem type extruder having a first extruder with a caliber of 50 mm and a second extruder with a caliber of 65 mm connected by a crossbar passage, heated, and kneaded to make a molten resin, after which isobutane was pressure-injected and kneaded inside the extruder, as a physical foaming agent, at a ratio of 5.8 parts by weight to 100 parts by weight of the mixed resin, the foaming molten material obtained was filled into and accumulated inside an accumulator having a caliber of 90 mm connected downstream from the second extruder, after which the foaming molten material was extruded all at once, by moving a movable ram, from the interior of the accumulator, through flat dies having a slit width of 90 mm and slit interval of 3 mm, to yield plank-form extruded open cell foam.

The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 5.

TABLE 5

| | | Physical Properties of Foam | | | | | | |
|---|---|---|---|---|---|---|---|---|
| Base Resin Mixed Resin Type | Foaming Conditions Foaming Temperature (° C.) | Density (kg/m³) | Open Cell Foaming Ratio (%) | Average Cell Diameter (mm) | Thickness (mm) | Width (mm) | Cell Uniformity | Manufacturing Stability |
| Ionomer/ | 115 | 43.7 | 97 | 1.27 | 45.9 | 267.6 | ○ | ○ |
| HDPE/ | 116 | 44.7 | 96 | 1.29 | 45.5 | 268.4 | ○ | |
| LDPE/ | 117 | 44.9 | 98 | 1.32 | 45.3 | 263.0 | ○ | |
| EMMA (Resin A/ Resin B/ Resin F/ Resin I) | 118 | 45.2 | 98 | 1.36 | 45.0 | 267.4 | ○ | |

Embodiment 5

Extruded plank-form extruded open cell foam was obtained with the same conditions as in Embodiment 1 except in that 100 parts by weight of mixed resin were made by mixing 33.3 parts by weight of "resin A," 16.7 parts by weight of "resin B," 25 parts by weight of "resin F," and 25 parts by weight of "resin I." The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 6.

TABLE 6

| | | Physical Properties of Foam | | | | | | |
|---|---|---|---|---|---|---|---|---|
| Base Resin Mixed Resin Type | Foaming Conditions Foaming Temperature (° C.) | Density (kg/m³) | Open Cell Foaming Ratio (%) | Average Cell Diameter (mm) | Thickness (mm) | Width (mm) | Cell Uniformity | Manufacturing Stability |
| Ionomer/ | 121 | 44.8 | 99 | 1.20 | 28.1 | 93.0 | ○ | ○ |
| /HDPE/ | 122 | 43.5 | 98 | 1.17 | 29.3 | 92.2 | ○ | |
| LDPE/ EMMA (Resin A/ Resin B/ Resin F/ Resin I) | 123 | 41.0 | 99 | 0.98 | 30.2 | 90.2 | ○ | |

Embodiment 6

Extruded plank-form extruded open cell foam was obtained with the same conditions as in Embodiment 1 except in that 100 parts by weight of mixed resin were made by mixing 40 parts by weight of "resin A," 3 parts by weight of "resin B." 28.5 parts by weight of "resin F." and 28.5 parts by weight of "resin I", and 8.7 parts by weight of isobutane were pressure-injected and kneaded into 100 parts by weight of the mixed resin inside the extruder. The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 7.

With Embodiment 7, in a foaming temperature range of 5° C. or higher, the change in density is less than 5 kg/m$^3$, and the change in open cell foaming ratio is 5% or less, outstanding manufacturing stability is exhibited, no cell crushing is seen in the center of the foam cross-section such as that seen in Comparative Example 3 (described subsequently), and outstanding cell uniformity is exhibited. It is seen that, with Embodiment 7, extruded open cell foam of low density and high foaming efficiency is obtained, even with the same amount of foaming agent as in Comparative Example 3.

Embodiment 8

Extruded plank-form extruded open cell foam was obtained with the same conditions as in Embodiment 1

TABLE 7

| Base Resin Mixed Resin Type | Foaming Conditions Foaming Temperature (° C.) | Density (kg/m$^3$) | Physical Properties of Foam | | | | | | |
| --- | --- | --- | --- | --- | --- | --- | --- | --- | --- |
| | | | Open Cell Foaming Ratio (%) | Average Cell Diameter (mm) | Thickness (mm) | Width (mm) | Cell Uniformity | Manufacturing Stability | |
| Ionomer/ | 120 | 31.0 | 95 | 1.32 | 43.5 | 107.6 | ○ | ○ | |
| HDPE/ | 121 | 31.2 | 96 | 1.35 | 43.3 | 105.5 | ○ | | |
| LDPE/ | 122 | 33.3 | 99 | 1.28 | 42.2 | 103.0 | ○ | | |
| EMMA | 123 | 33.8 | 100 | 1.20 | 41.7 | 101.4 | ○ | | |
| (Resin A/ Resin B/ Resin F/ Resin I) | | | | | | | | | |

Embodiment 7

Extruded plank-form extruded open cell foam was obtained with the same conditions as in Embodiment 1 except in that 100 parts by weight of mixed resin were made by mixing 38 parts by weight of "resin A," 5 parts by weight of "resin B," 28.5 parts by weight of "resin F," and 28.5 parts by weight of "resin I", and 8.7 parts by weight of isobutane were pressure-injected and kneaded into 100 parts by weight of the mixed resin inside the extruder. The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 8.

except in that 100 parts by weight of mixed resin were made by mixing 38 parts by weight of "resin A," 5 parts by weight of "resin C," 28.5 parts by weight of "resin F," and 28.5 parts by weight of "resin I", and 8.7 parts by weight of isobutane were pressure-injected and kneaded into 100 parts by weight of the mixed resin inside the extruder. The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 9.

TABLE 8

| Base Resin Mixed Resin Type | Foaming Conditions Foaming Temperature (° C.) | Density (kg/m$^3$) | Physical Properties of Foam | | | | | | |
| --- | --- | --- | --- | --- | --- | --- | --- | --- | --- |
| | | | Open Cell Foaming Ratio (%) | Average Cell Diameter (mm) | Thickness (mm) | Width (mm) | Cell Uniformity | Manufacturing Stability | |
| Ionomer/ | 119 | 31.4 | 96 | 1.39 | 41.7 | 109.0 | ○ | ○ | |
| HDPE/ | 120 | 30.9 | 96 | 1.42 | 42.2 | 108.4 | ○ | | |
| LDPE/ | 121 | 31.1 | 97 | 1.34 | 42.6 | 106.4 | ○ | | |
| EMMA | 122 | 31.0 | 99 | 1.36 | 43.3 | 106.2 | ○ | | |
| (Resin A/ Resin B/ Resin F/ Resin I) | 123 | 31.8 | 99 | 1.36 | 42.4 | 105.4 | ○ | | |

TABLE 9

| Base Resin Mixed Resin Type | Foaming Conditions Foaming Temperature (° C.) | Physical Properties of Foam ||||||| Manufacturing Stability |
|---|---|---|---|---|---|---|---|---|
| | | Density (kg/m$^3$) | Open Cell Foaming Ratio (%) | Average Cell Diameter (mm) | Thickness (mm) | Width (mm) | Cell Uniformity | |
| Ionomer/ | 118 | 41.0 | 96 | 1.20 | 41.0 | 105.2 | ○ | ○ |
| LLDPE/ | 119 | 42.0 | 97 | 1.27 | 42.0 | 104.8 | ○ | |
| LDPE/ | 120 | 42.9 | 95 | 1.34 | 42.9 | 103.0 | ○ | |
| EMMA | 121 | 40.3 | 100 | 1.22 | 40.3 | 102.0 | ○ | |
| (Resin A/ Resin C/ Resin F/ Resin I) | | | | | | | | |

Embodiment 9

Extruded plank-form extruded open cell foam was obtained with the same conditions as in Embodiment 1 except in that 100 parts by weight of mixed resin were made by mixing 38 parts by weight of "resin A," 5 parts by weight of "resin D," 28.5 parts by weight of "resin F," and 28.5 parts by weight of "resin I", and 8.7 parts by weight of isobutane were pressure-injected and kneaded into 100 parts by weight of the mixed resin inside the extruder. The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 10.

Embodiment 10

Extruded plank-form extruded open cell foam was obtained with the same conditions as in Embodiment 1 except in that 100 parts by weight of mixed resin were made by mixing 38 parts by weight of "resin A," 5 parts by weight of "resin E," 28.5 parts by weight of "resin F," and 28.5 parts by weight of "resin I", and 8.7 parts by weight of isobutane were pressure-injected and kneaded into 100 parts by weight of the mixed resin inside the extruder. The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 11.

TABLE 10

| Base Resin Mixed Resin Type | Foaming Conditions Foaming Temperature (° C.) | Physical Properties of Foam ||||||| Manufacturing Stability |
|---|---|---|---|---|---|---|---|---|
| | | Density (kg/m$^3$) | Open Cell Foaming Ratio (%) | Average Cell Diameter (mm) | Thickness (mm) | Width (mm) | Cell Uniformity | |
| Ionomer/ | 119 | 34.8 | 97 | 1.15 | 38.9 | 105.0 | ○ | ○ |
| PP/LDPE/ | 120 | 34.3 | 99 | 1.13 | 38.6 | 105.0 | ○ | |
| EMMA | 121 | 36.8 | 100 | 1.04 | 37.1 | 104.5 | ○ | |
| (Resin A/ Resin D/ Resin F/ Resin I) | | | | | | | | |

TABLE 11

| Base Resin Mixed Resin Type | Foaming Conditions Foaming Temperature (° C.) | Physical Properties of Foam ||||||| Manufacturing Stability |
|---|---|---|---|---|---|---|---|---|
| | | Density (kg/m$^3$) | Open Cell Foaming Ratio (%) | Average Cell Diameter (mm) | Thickness (mm) | Width (mm) | Cell Uniformity | |
| Ionomer/PP/ | 118 | 40.5 | 96 | 1.02 | 32.0 | 102.2 | ○ | ○ |
| LDPE/EMMA | 119 | 38.3 | 100 | 1.08 | 33.9 | 100.0 | ○ | |
| (Resin A/Resin E/ | 120 | 37.9 | 100 | 1.12 | 34.4 | 100.2 | ○ | |
| Resin F/Resin I) | | | | | | | | |

Embodiment 11

Extruded plank-form extruded open cell foam was obtained with the same conditions as in Embodiment 1 except in that 100 parts by weight of mixed resin were made by mixing 29 parts by weight of "resin A," 5 parts by weight of "resin B," 37 parts by weight of "resin F," and 29 parts by weight of "resin G." The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 12.

TABLE 12

| Base Resin Mixed Resin Type | Foaming Conditions Foaming Temperature (° C.) | Density (kg/m³) | Open Cell Foaming Ratio (%) | Average Cell Diameter (mm) | Thickness (mm) | Width (mm) | Cell Uniformity | Manufacturing Stability |
|---|---|---|---|---|---|---|---|---|
| Ionomer/HDPE/ LDPE/LDPE (Resin A/Resin B/ Resin F/Resin G) | 117<br>118<br>119 | 42.9<br>43.8<br>47.6 | 92<br>93<br>96 | 1.23<br>1.19<br>1.12 | 29.2<br>28.9<br>26.9 | 99.0<br>98.0<br>94.0 | ○<br>○<br>○ | ○ |

Embodiment 12

Extruded plank-form extruded open cell foam was obtained with the same conditions as in Embodiment 1 except in that 100 parts by weight of mixed resin were made by mixing 38 parts by weight of "resin A," 5 parts by weight of "resin B," 28.5 parts by weight of "resin F," and 28.5 parts by weight of "resin J." The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 13.

TABLE 13

| Base Resin Mixed Resin Type | Foaming Conditions Foaming Temperature (° C.) | Density (kg/m³) | Open Cell Foaming Ratio (%) | Average Cell Diameter (mm) | Thickness (mm) | Width (mm) | Cell Uniformity | Manufacturing Stability |
|---|---|---|---|---|---|---|---|---|
| Ionomer/HDPE/ LDPE/VLDPE (Resin A/Resin B/ Resin F/Resin J) | 119<br>120<br>121 | 34.8<br>35.2<br>39.0 | 92<br>93<br>96 | 1.27<br>1.23<br>1.17 | 36.8<br>36.3<br>33.7 | 97.4<br>96.2<br>94.2 | ○<br>○<br>○ | ○ |

Embodiment 13

Extruded plank-form extruded open cell foam was obtained with the same conditions as in Embodiment 1 except in that 100 parts by weight of mixed resin were made by mixing 38 parts by weight of "resin A," 5 parts by weight of "resin B," 28.5 parts by weight of "resin F," and 28.5 parts by weight of "resin K." The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 14.

TABLE 14

| Base Resin Mixed Resin Type | Foaming Conditions Foaming Temperature (° C.) | Density (kg/m³) | Open Cell Foaming Ratio (%) | Average Cell Diameter (mm) | Thickness (mm) | Width (mm) | Cell Uniformity | Manufacturing Stability |
|---|---|---|---|---|---|---|---|---|
| Ionomer/HDPE/ LDPE/EMAA | 115<br>116 | 33.4<br>33.1 | 67<br>68 | 0.81<br>0.79 | 39.5<br>39.7 | 110.0<br>110.2 | ○<br>○ | ○ |

TABLE 14-continued

| Base Resin Mixed Resin Type | Foaming Conditions Foaming Temperature (° C.) | Density (kg/m³) | Open Cell Foaming Ratio (%) | Average Cell Diameter (mm) | Thickness (mm) | Width (mm) | Cell Uniformity | Manufacturing Stability |
|---|---|---|---|---|---|---|---|---|
| (Resin A/Resin B/ | 117 | 32.9 | 68 | 0.82 | 39.8 | 108.2 | ○ | |
| Resin F/Resin K) | 118 | 33.2 | 68 | 0.95 | 40.2 | 108.0 | ○ | |
| | 119 | 33.0 | 68 | 0.93 | 40.4 | 108.0 | ○ | |
| | 120 | 33.4 | 70 | 0.90 | 40.3 | 106.2 | ○ | |
| | 121 | 33.6 | 71 | 0.92 | 40.6 | 104.0 | ○ | |

COMPARATIVE EXAMPLE 1

Extruded plank-form extruded open cell foam was obtained with the same conditions as in Embodiment 1 except in that 100 parts by weight of mixed resin were made by mixing 43 parts by weight of "resin A," and 57 parts by weight of "resin G." The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 15.

Example 1 is usable as a product, cell unevenness is observed very locally in the foam cross-section, wherefore the foam of Embodiment 1 exhibits more outstanding cell uniformity.

COMPARATIVE EXAMPLE 2

Extruded plank-form extruded open cell foam was obtained with the same conditions as in Embodiment 1 except in that 100 parts by weight of mixed resin were made

TABLE 15

| Base Resin Mixed Resin Type | Foaming Conditions Foaming Temperature (° C.) | Density (kg/m³) | Open Cell Foaming Ratio (%) | Average Cell Diameter (mm) | Thickness (mm) | Width (mm) | Cell Uniformity | Manufacturing Stability |
|---|---|---|---|---|---|---|---|---|
| Ionomer/LDPE | 115 | 37.7 | 100 | 1.41 | 34.9 | 101.4 | Δ | ○ |
| (Resin A/ | 116 | 38.6 | 100 | 1.38 | 36.7 | 100.0 | Δ | |
| Resin G) | 117 | 36.5 | 100 | 1.43 | 37.5 | 99.6 | Δ | |

With Comparative Example 1, in a foaming temperature range of 3° C. or higher, the change in density is less than 5 kg/m³, and the change in open cell foaming ratio is 5% or less. However, with Embodiment 1 that temperature range is broadened to 5° C. or greater, and Embodiment 1 is recognized as exhibiting more outstanding manufacturing stability. Also, although the foam obtained in Comparative by mixing 43 parts by weight of "resin A," 28.5 parts by weight of "resin F," and 28.5 parts by weight of "resin I." The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 16.

TABLE 16

| Base Resin Mixed Resin Type | Foaming Conditions Foaming Temperature (° C.) | Density (kg/m³) | Open Cell Foaming Ratio (%) | Average Cell Diameter (mm) | Thickness (mm) | Width (mm) | Cell Uniformity | Manufacturing Stability |
|---|---|---|---|---|---|---|---|---|
| Ionomer/LDPE/ | 115 | 36.0 | 86 | 1.26 | 40.9 | 102.4 | ○ | X |
| EMMA | 116 | 41.9 | 98 | 0.98 | 36.1 | 100.4 | ○ | |
| (Resin A/Resin F/ | 117 | 50.4 | 100 | — | 32.6 | 91.2 | X | |
| Resin I) | 118 | 60.8 | 100 | — | 27.3 | 84.0 | X | |

("—" in table indicates no measurement made)

Comparative Example 2 is a comparative example for Embodiment 3. With Comparative Example 2, in a foaming temperature range of 3° C., the change in density is 5 kg/m³ or greater, manufacturing stability is lacking, and cell crushing was observed in the center of the cross-section of the foam obtained at a foaming temperature of 117° C. or higher.

COMPARATIVE EXAMPLE 3

Extruded plank-form extruded open cell foam was obtained with the same conditions as in Embodiment 1 except in that 100 parts by weight of mixed resin were made by mixing 43 parts by weight of "resin A," 28.5 parts by weight of "resin F," and 28.5 parts by weight of "resin I," and 8.7 parts by weight of isobutane were pressure injected and kneaded into 100 parts by weight of the mixed resin inside the extruder. The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 17.

TABLE 17

| Base Resin Mixed Resin Type | Foaming Conditions Foaming Temperature (° C.) | Physical Properties of Foam | | | | | | |
|---|---|---|---|---|---|---|---|---|
| | | Density (kg/m³) | Open Cell Foaming Ratio (%) | Average Cell Diameter (mm) | Thickness (mm) | Width (mm) | Cell Uniformity | Manufacturing Stability |
| Ionomer/LDPE | 117 | 31.8 | 76 | 1.68 | 43.9 | 102.0 | ○ | X |
| EMMA | 118 | 34.5 | 85 | 1.42 | 37.2 | 101.4 | ○ | |
| (Resin A/Resin F/ | 119 | 41.7 | 100 | 1.03 | 34.0 | 91.8 | ○ | |
| Resin I) | 120 | 41.4 | 100 | — | 34.9 | 88.0 | X | |
| | 121 | 49.4 | 100 | — | 31.6 | 82.0 | X | |

("—" in table indicates no measurement made)

Comparative Example 3 is a comparative example for Embodiment 7. With Comparative Example 3, in a foaming temperature range of 3° C., the change in density is 5 kg/m³ or greater, manufacturing stability is lacking, and cell crushing was observed in the center of the cross-section of the foam obtained at a foaming temperature of 120° C. or higher.

COMPARATIVE EXAMPLE 4

Extruded plank-form extruded open cell foam was obtained with the same conditions as in Embodiment 1 except in that 100 parts by weight of mixed resin were made by mixing 34 parts by weight of "resin A," 37 parts by weight of "resin F," and 29 parts by weight of "resin G." The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 18.

TABLE 18

| Base Resin Mixed Resin Type | Foaming Conditions Foaming Temperature (° C.) | Physical Properties of Foam | | | | | | |
|---|---|---|---|---|---|---|---|---|
| | | Density (kg/m³) | Open Cell Foaming Ratio (%) | Average Cell Diameter (mm) | Thickness (mm) | Width (mm) | Cell Uniformity | Manufacturing Stability |
| Ionomer/LDPE/ | 116 | 30.6 | 38 | 1.89 | 39.3 | 100.6 | ○ | X |
| LDPE | 117 | 40.2 | 78 | — | 33.4 | 97.0 | Δ | |
| (Resin A/Resin F/ | 118 | 48.2 | 95 | — | 25.5 | 92.2 | Δ | |
| Resin G) | 119 | 57.6 | 100 | — | 19.5 | 80.6 | Δ | |

("—" in table indicates no measurement made)

Comparative Example 4 is a comparative example for Embodiment 11. With Comparative Example 4, in a foaming temperature range of 3° C., the change in density exceeds 5 kg/m³, manufacturing stability is lacking, and portions of cell unevenness were observed in the cross-section of the foam obtained at a foaming temperature of 117° C. or higher.

COMPARATIVE EXAMPLE 5

Extruded plank-form extruded open cell foam was obtained with the same conditions as in Embodiment 1 except in that 100 parts by weight of mixed resin were made by mixing 43 parts by weight of "resin A," 28.5 parts by weight of "resin F," and 28.5 parts by weight of "resin J." The density, open cell foaming ratio, average cell diameter, thickness, and width of the foam so obtained were measured, respectively, the foam cross-sectional cell uniformity and manufacturing stability were evaluated as noted above, and the results indicated, respectively, in Table 19.

obtained, and the 5% compressive strength and 25% compressive strength, and 50% compression strength were calculated therefrom.

Defection Set by Constant Compression

Except in that the conditions of the test atmosphere were made 23° C. temperature and 50% relative humidity, defection set by constant compression tests were performed according to JIS K6401 (1980). The dimensions of the test pieces were made 50 mm longitudinally×50 mm across×the thickness of the foam. The test piece was compressed to 50% and left standing in that condition for 22 hours, after which the compression was released. The thickness of the test piece was then measured, 30 minutes later and 24 hours later, respectively, and the percentage of defection set by constant compression was calculated.

Defection Set by Repeated Compressions

Except in that the conditions of the test atmosphere were made 23° C. temperature and 50% relative humidity, defection set by repeated compressions tests were performed

TABLE 19

| Base Resin Mixed Resin Type | Foaming Conditions Foaming Temperature (° C.) | Physical Properties of Foam | | | | | | |
|---|---|---|---|---|---|---|---|---|
| | | Density (kg/m³) | Open Cell Foaming Ratio (%) | Average Cell Diameter (mm) | Thickness (mm) | Width (mm) | Cell Uniformity | Manufacturing Stability |
| Ionomer/LDPE/ VLDPE (Resin A/Resin F/ Resin J) | 117 | 34.7 | 92 | 1.47 | 39.3 | 98.0 | ○ | X |
| | 118 | 42.4 | 98 | 0.90 | 33.4 | 90.0 | ○ | |
| | 119 | 60.3 | 100 | 0.62 | 25.5 | 68.6 | X | |

Comparative Example 5 is a comparative example for Embodiment 12. With Comparative Example 5, in a foaming temperature range of 3° C., the change in density is 5 kg/m³ or greater, manufacturing stability is lacking, and cell crushing was observed in the center of the cross-section of the foam obtained at a foaming temperature of 119° C. or higher.

COMPARATIVE EXAMPLE 6

An attempt was made to obtain rod-shaped extruded open cell foam with the same conditions as in Embodiment 1 except in that 100 parts by weight of mixed resin were made by mixing 5 parts by weight of "resin B," 67 parts by weight of "resin F," and 28 parts by weight of "resin H," and in that the die was made 4 mm φ rod die, but no foam was obtained.

Below, the compressive strengths of the foams obtained in Embodiments 6 to 9 and Comparative Example 3 are given in Table 20, and the defection set by constant compression and defection set by repeated compressions of the foams obtained in Embodiments 6 to 10 and Comparative Example 3 are given in Tables 21 and 22, respectively. The methods of testing for compressive strength and permanent compressive strain were as described below.

Compressive Strength

Static compression tests were performed in accordance with JIS Z0234 (1976) Method A. The dimensions of the test pieces were made 50 mm longitudinally×50 mm across×the thickness of the foam and the load speed was made 10 mm/minute. After compressing the test piece to 80% of its thickness, the compression was released at the same speed as the load speed, and measurement was concluded at the point in time where the compressive stress became 0 Pa, to yield a stress-strain curve. The loads at the time of 5% compression, at the time of 25% compression and at the time of 50% compression, respectively, were read from the curve according to JIS K6401 (1980). The dimensions of the test pieces were made 50 mm longitudinally×50 mm across×the thickness of the foam. The test piece was subjected to 80,000 continuously repeated compressions to 50% of the thickness thereof, at a speed of 60 revolutions/minute. Then the thickness of the test piece was measured, 30 minutes and 24 hours after the compression was released, respectively, and the percentage of defection set by repeated compressions was calculated therefrom.

TABLE 20

| | 5% Compressive Strength (kPa) | 25% Compressive Strength (kPa) |
|---|---|---|
| Embodiment 6 | 5.16 | 9.41 |
| Embodiment 7 | 6.09 | 10.36 |
| Embodiment 8 | 4.32 | 8.21 |
| Embodiment 9 | 5.91 | 10.37 |
| Comparative Example 3 | 4.45 | 7.66 |

TABLE 21

| | Percentage of defection set by constant compression After 30 Minutes (%) | Percentage of defection set by constant compression After 24 Hours (%) |
|---|---|---|
| Embodiment 6 | 6.8 | 2.0 |
| Embodiment 7 | 7.4 | 2.2 |
| Embodiment 8 | 4.4 | 2.3 |
| Embodiment 9 | 6.1 | 1.8 |
| Embodiment 10 | 4.9 | 1.1 |
| Comparative Example 3 | 3.4 | 1.0 |

TABLE 22

| | Percentage of defection set by repeated compressions After 30 Minutes (%) | Percentage of defection set by repeated compressions After 24 Hours (%) |
|---|---|---|
| Embodiment 6 | 10.7 | 3.8 |
| Embodiment 7 | 10.9 | 4.5 |
| Embodiment 8 | 9.0 | 3.1 |
| Embodiment 9 | 8.3 | 2.6 |
| Embodiment 10 | 7.8 | 2.4 |
| Comparative Example 3 | 5.4 | 2.8 |

Embodiment 14

100 weight parts of a mixed resin composed of 38.1 weight parts "resin A," 28.6 weight parts "resin I," 28.6 weight parts "resin F," and 4.7 weight parts "resin B" was blended with 2 weight parts of a foaming regulator master batch prepared by blending 10 weight parts talc and 5 weight parts sodium citrate with 100 weight parts "resin F," and 10 weight parts of an anti-shrinkage agent master batch prepared by blending 12 weight parts monostearic acid glyceride with 100 weight parts "resin F." This product was supplied to an extruder and heated and kneaded to produce a molten resin, after which isobutane was pressure-kneaded as a physical foaming agent into the molten resin in the extruder in a proportion of 6.8 weight parts per 100 weight parts of the above-mentioned mixed resin, thereby producing a foamable melt. Next, the melt kneaded in the extruder was extruded from a flat die with a slit gap of 3 mm and a slit width of 80 mm at the resin temperature shown in Table 1, which yielded an attractive open-cell foam board.

Table 23 gives the results of measuring the thickness, width, density, open-cell ratio, average cell diameter, stress relaxation ratio, 50% compression set, 50% compression strength, 25% compression strength, average pore diameter, and so forth for the foam thus obtained.

Embodiment 15

In the same manner as in Embodiment 14 other than using "resin H" instead of the "resin I" used in Embodiment 14, an attractive open-cell foam board was obtained. Table 23 lists the properties of the foam thus obtained. It can be seen from Embodiments 14 and 15 that the number and diameter of pores formed in the cell walls can be varied by adjusting the fluidity of the mixed components of the base resin, allowing foams of various stress relaxation ratio and so on to be obtained.

Embodiment 16

In the same manner as in Embodiment 15 other than extrusion-foaming the foamable melt at 122° C., an attractive open-cell foam board was obtained. Table 23 lists the properties of the foam thus obtained. It can be seen from Embodiments 15 and 16 that the open-cell ratio of the obtained foam can be varied by adjusting the resin temperature during extrusion foaming, allowing various stress relaxation ratio values to be obtained.

Embodiment 17

In the same manner as in Embodiment 14 other than changing the amount of foaming regulator master batch used in Embodiments 14 to 5 weight parts, and extrusion-foaming the foamable melt at 119° C., an attractive open-cell foam board was obtained. Table 23 lists the properties of the foam thus obtained It can be seen from Embodiments 14 and 17 that if the amount of foaming regulator is increased and the average cell diameter of the foam is reduced, the path over which air travels in and out of the foam will be longer, and the stress relaxation ratio of the resulting foam will be greater.

Embodiment 18

In the same manner as in Embodiment 14 other than using 4.7 parts by weight of "resin C" instead of "resin B," and extrusion-foaming the foamable melt at 118° C., an attractive open-cell foam board was obtained.

Embodiment 19

An attractive open-cell foam board was obtained by pressing with a roll by a thickness of 20% of the thickness of the foam board obtained in Embodiment 18. It can be seen from Embodiments 18 and 19 that the open-cell ratio, pore diameter, pore count, and so forth can be varied, and the stress relaxation ratio varied, by secondary working with a roll press or the like.

COMPARATIVE EXAMPLE 7

In the same manner as in Embodiment 14 other than using "resin F" instead of the mixed resin and changing the amount of foaming regulator master batch used in Embodiment 14 to 12 weight parts and extrusion-foaming the foamable melt at 108° C., an attractive open-cell foam board was obtained. Physical properties of the foam thus obtained are shown in Table 24 below. The foam obtained in Comparative Example 7 had low stress relaxation ratio and high compression set.

COMPARATIVE EXAMPLE 8

In the same manner as in Comparative Example 7 other than changing the amount of foaming regulator master batch to 2 weight parts, an attractive closed-cell foam board was obtained. Through holes were formed by needle punching with needles 0.7 mm in diameter and 25 mm in length, arranged at a pitch of 2.0 mm and pressed against the top and bottom sides in the thickness direction of the foam board obtained above, which yielded an open-cell foam. Table 24 lists the properties of the foam thus obtained. The foam obtained in Comparative Example 8 had high stress relaxation ratio, but its compression set was also high.

TABLE 23

| | Embodiment | | | | | |
|---|---|---|---|---|---|---|
| Category | 14 | 15 | 16 | 17 | 18 | 19 |
| Extruded resin temp. (° C.) | 120 | 120 | 122 | 119 | 118 | 118 |
| Foam | | | | | | |
| Thickness (mm) | 47 | 53 | 56 | 50 | 54 | 52 |
| Width (mm) | 264 | 267 | 268 | 248 | 265 | 265 |
| Density (kg/m$^3$) | 38.5 | 35.6 | 36.0 | 37.9 | 41.3 | 42.0 |
| Open-cell ratio (%) | 99 | 92 | 68 | 97 | 92 | 100 |
| X/Y | 0.9 | 0.9 | 1.0 | 0.9 | 1.0 | 1.0 |

TABLE 23-continued

| Category | Embodiment | | | | | |
|---|---|---|---|---|---|---|
| | 14 | 15 | 16 | 17 | 18 | 19 |
| X/Z | 0.9 | 0.9 | 0.9 | 0.9 | 0.9 | 0.9 |
| Av. cell diameter (mm) | 1.78 | 1.91 | 2.10 | 1.23 | 1.62 | 1.59 |
| Av. pore diameter (mm) | 0.28 | 0.34 | 0.33 | 0.26 | 0.51 | 0.23 |
| Av. cell wall thickness (mm) | 32.7 | 35.4 | 26.1 | 24.0 | 30.0 | 28.2 |
| Av. No. of pores per cell (–) | 3.25 | 2.11 | 1.18 | 1.38 | 0.89 | 2.50 |
| Stress relaxation ratio (%) | | | | | | |
| After 5 minutes | 45.0 | 75.7 | 60.6 | 61.3 | 54.3 | 50.0 |
| After 1 minute | 38.0 | 63.2 | 46.0 | 54.1 | 46.3 | 41.6 |
| 50% compression set (%) | 3.8 | 3.5 | 6.2 | 1.6 | 2.6 | 1.5 |
| 50% compression strength (kPa) | 9.8 | 59.0 | 52.5 | 25.9 | 26.0 | 18.0 |
| 25% compression strength (kPa) | 6.2 | 26.3 | 23.5 | 11.3 | 13.3 | 9.52 |

TABLE 24

| Category | Comparative Example | |
|---|---|---|
| | 7 | 8 |
| Extruded resin temp. (° C.) | 108 | 108 |
| Foam | | |
| Thickness (mm) | 48 | 49 |
| Width (mm) | 172 | 180 |
| Density (kg/m$^3$) | 34.4 | 33.0 |
| Open-cell ratio (%) | 11 | 96.5 |
| X/Y | 1.0 | 1.1 |
| X/Z | 0.9 | 1.1 |
| Av. cell diameter (mm) | 0.79 | 1.52 |
| Av. pore diameter (mm) | 0.32 | 0.34 |
| Av. cell wall thickness (μm) | 8.7 | 18.7 |
| Av. No. of pores per cell (–) | 0.59 | 1.18 |
| Stress relaxation ratio (%) | | |
| After 5 minutes | 16.6 | 45.5 |
| After 1 minute | 12.4 | 38.0 |
| 50% compression set (%) | 7.2 | 7.4 |
| 50% compression strength (kPa) | 157.4 | 38.5 |
| 25% compression strength (kPa) | 79.2 | 17.5 |

Industrial Applicability

The extruded polyolefin resin foam of the present invention exhibits a high expansion ratio, uniform cell diameter, and outstanding mechanical properties, and is well suited for use as cushion material, packaging material, sound absorbing material, water absorbing material, anti-vibration material, and various types of industrial filter.

What is claimed is:

1. An extruded polyolefin resin foam, characterized in that said extruded polyolefin resin foam is an extruded foam exhibiting an open cell ratio of 50% or greater, and that base resin thereof is principally composed of a mixed polymer consisting of 4.5 to 75 parts by weight of component A consisting of an ethylene ionomer resin, 0.5 to 30 parts by weight of component B consisting of a polyolefin resin having a melting point exceeding 120° C., and 20 to 95 parts by weight of component C consisting of one or two or more polymers selected from a group of ethylene-propylene rubbers, styrene elastomers, and polyethylene resins having melting points of 120° C. or lower (where component A+component B+component C=100 parts by weight).

2. The extruded polyolefin resin foam according to claim 1, characterized in that said component B consisting of a polyolefin resin having a melting point exceeding 120° C. is one type or a mixed resin of two or more types selected from among polypropylene resin, linear low-density polyethylenes, and polyethylene resins having a density of 940 kg/m$^3$ or greater.

3. The extruded polyolefin resin foam according to claim 1, characterized in that said polyethylene resin having a melting point of 120° C. or lower in said component C is one type or a mixed resin of two or more types selected from among low-density polyethylenes, ethylene-α or β unsaturated carboxylic acid copolymers (but excluding ionomers), and ethylene-vinyl acetate copolymers.

4. The extruded polyolefin resin foam according to claim 1, characterized in that 0.1 to 15 parts by weight of an anti-shrinking agent are added to 100 parts by weight of said base resin.

5. The extruded polyolefin resin foam according to claim 1 characterized in that said extruded foam has a density of 15 to 200 kg/m$^3$ and a thickness of 0.5 to 200 mm.

6. The extruded polyolefin resin foam according to claim 1 characterized in that said extruded foam is sheet-form foam or plank-form foam.

7. The extruded polyolefin resin foam according to claim 1 characterized in that said extruded foam is rod-shaped foam having a density of 15 to 100 kg/m$^3$, and area of vertical cross-section thereof orthogonal to direction of extrusion being 0.7 cm$^2$ or greater.

8. The extruded polyolefin resin foam according to claims 1 wherein stress relaxation ratio is at least 30% after sustaining 50% compression for one minute of an extruded polyolefin resin foam, the 25% compression strength in the thickness direction is 1 to 50 kPa, and the 50% compression set is 7% or less.

9. The extruded polyolefin resin foam according to claims 1, wherein the cell shape satisfies the following formulas (a) to (c), and pores are formed in the foam wall, $$0.3 \leq X/Z \leq 1.5 \qquad (a)$$

$$0.3 \leq X/Y \leq 1.5 \qquad (b)$$

$$0.3 \leq (X+Y+Z)/3 \leq 10 \qquad (c)$$

(where X, Y, and Z are the average cell diameter in the thickness, extrusion, and width directions of the foam, respectively, and the units are in millimeters).

10. The extruded polyolefin resin foam according to claim 4, characterized in that said extruded foam has a density of 15 to 200 kg/m$^3$ and a thickness of 0.5 to 200 mm.

11. The extruded polyolefin resin foam according to claim 4, characterized in that said extruded foam is sheet-form foam or plank-form foam.

12. The extruded polyolefin resin foam according to claim 4, characterized in that said extruded foam is rod-shaped foam having a density of 15 to 100 kg/m³, and area of vertical cross-section thereof orthogonal to direction of extrusion being 0.7 cm² or greater.

13. The extruded polyolefin resin foam according to claim 4 wherein stress relaxation ratio is at least 30% after sustaining 50% compression for one minute of an extruded polyolefin resin foam, the 25% compression strength in the thickness direction is 1 to 50 kpa, and the 50% compression set is 7% or less.

14. The extruded polyolefin resin foam according to claim 1, wherein the cell shape satisfies the following formulas (a) to (c), and pores are formed in the foam wall, $$0.3 \leq X/Z \leq 1.5 \tag{a}$$

$$0.3 \leq X/Y \leq 1.5 \tag{b}$$

$$0.3 \leq (ti\ X+Y+Z)/3 \leq 10 \tag{c}$$

(where X, Y, and Z are the average cell diameter in the thickness, extrusion, and width directions of the foam, respectively, and the units are in millimeters).

* * * * *